US006041140A

United States Patent [19]
Binns et al.

[11] Patent Number: 6,041,140
[45] Date of Patent: Mar. 21, 2000

[54] APPARATUS FOR INTERACTIVE IMAGE CORRELATION FOR THREE DIMENSIONAL IMAGE PRODUCTION

[75] Inventors: Bruce W. Binns, Melbourne Beach, Fla.; Rodney M. Price, Chamblee, Ga.; Charles S. Palm, Westlake Village, Calif.; Suzanne E. Weaver, Melbourne Beach, Fla.

[73] Assignee: Synthonics, Incorporated, Westlake Village, Calif.

[21] Appl. No.: 08/318,047

[22] Filed: Oct. 4, 1994

[51] Int. Cl.⁷ ........................................................ G06K 9/62
[52] U.S. Cl. ............................ 382/209; 382/154; 345/419
[58] Field of Search ................................ 395/119, 118, 395/125, 162, 164, 165; 382/218, 154, 106, 217, 209, 278, 307; 345/418, 419, 425

[56] References Cited

U.S. PATENT DOCUMENTS

| | | | |
|---|---|---|---|
| 4,429,414 | 1/1984 | Asakawa | 382/218 |
| 4,503,557 | 3/1985 | Maeda | 382/218 |
| 4,606,066 | 8/1986 | Hata et al. | 382/304 |
| 4,825,393 | 4/1989 | Nishiya | 382/154 |
| 4,837,616 | 6/1989 | Kasano et al. | 382/154 |
| 5,301,344 | 4/1994 | Kolchinsky | 395/800 |
| 5,309,522 | 5/1994 | Dye | 382/154 |
| 5,373,567 | 12/1994 | Takahashi et al. | 382/218 |
| 5,535,292 | 7/1996 | Ranganathan et al. | 382/304 |

OTHER PUBLICATIONS

Gonzales et al, "Digital Image Processing" 1992, pp. 583–585.

Atmel Corporation, "Configurable Logic Design and Application Book 1994 ● 1995".

*Primary Examiner*—Amelia Au
*Assistant Examiner*—Larry Prikockis
*Attorney, Agent, or Firm*—McDermott, Will & Emery

[57] ABSTRACT

A hardware accelerator board utilizes field programmable gate arrays which can be reprogrammed on the fly during program execution to achieve dedicated hardware processing speeds and greater flexibility than provided by compiled or interpreted software. The accelerator board is used to permit the user to interact with the computer system in which the board is installed to interactively produce a correlation of two images of the same scene. Correlated images are used to determine depth of objects in the scene shown in the correlated images.

7 Claims, 9 Drawing Sheets

3D DATABASE

| LEFT HAND IMAGE | | | RIGHT HAND IMAGE | |
|---|---|---|---|---|
| GRID POINT | | CALCULATED DEPTH | CORRELATION RESULTS | |
| $X_L$ | $Y_L$ | $Z_L$ | $W_R$ | $Y_R$ |
| 0.1 | 0.1 | 6.3 | a | b |
| 0.2 | 0.1 | 6.0 | c | d |
| 0.3 | 0.1 | 5.4 | e | f |
| ..... | ..... | ..... | ..... | ..... |

APPARATUS FOR INTERACTIVE IMAGE CORRELATION FOR THREE DIMENSIONAL IMAGE PRODUCTION

TECHNICAL FIELD

The invention relates to the field of image processing and more particularly to methods and apparatus for the interactive correlation of images for the production of three dimensional images.

BACKGROUND ART

Since the invention of the stereoscope in 1847, inventors have attempted to replicate three dimensional (3D) images found in nature. Two dimensional images lack realism due to the absence of depth queues. Many techniques have been devised for producing 3D images with varying degrees of success.

Stereoscopic photographic cameras are known which utilize a single camera body and two objective lenses separated by a fixed distance, usually corresponding to the interocular distance. Other such cameras use a single objective and external arrangements which form two image areas on film positioned on the camera's image plane. Still other arrangements use two separate cameras separated by a fixed distance to form images corresponding to a left and right eye view of the scene being photographed. Still other arrangements use a single camera moved from one location to another to obtain stereo images.

Another technique for capturing stereophotography is to use a single camera and move the camera from one location to another to obtain stereo images.

Once stereoscopic photographic images of the prior art are developed, they are often viewed through separate eye pieces, one for each eye. Each eye piece projects a view of a respective one of the developed images which the user's eyes would have seen had the eyes viewed the scene directly. Depth is clearly discernable when viewing a stereoscopic image.

There are several problems with prior art techniques for generating three dimensional images. First, the requirement that there be a fixed camera to camera or objective to objective separation limits flexibility in the construction of cameras. The requirement for two objective lenses or two cameras dictates special apparatus in order to capture stereoscopic images.

Another problem with the prior art is that complicated lens arrangements are necessary to view stereoscopic images. Further, in the stereoscopic photographic systems of the prior art, depth was not readily quantifiable.

Calculations of depth is a difficult task when using images captured from different positions vis-a-vis the scene being photographed because the planar relationships which result from projection of a three dimensional scene onto a two dimensional plane do not undergo a linear transformation or mapping compared with the same points projected onto a different image plane. A scene viewed from one point is seen differently from the same scene viewed from another point. As one changes viewing positions, some object portions become hidden as the view point changes. Planes which are viewed normally in one view are reduced in extent when viewed obliquely. The prior art does not allow for rapid and interactive correlation of two images of the same scene captured from different perspectives.

Automated image processing techniques are known for correlating portions of images with known patterns. For example, vertical views (pictures) of a tractor at different rotations may be scaled to reflect a view of the tractor from 1,000 feet above the tractor. These vertical views can then be respectively compared with a picture of farmland with the same tractor on it taken at 1,000 feet by sliding each vertical view, one at a time, over all possible portions of such a picture until alignment occurs. When such an alignment occurs, one may conclude that a tractor is located at the point on the image of the farmland at which the best match occurs and that the tractor has the particular orientation corresponding to the rotation of the vertical view which produces the best correlation.

Image correlation done in this way is a very slow process. Such a process has further drawbacks. The scale and perspective need to be the same in order to assure similarity of appearance between the reference pattern and the pattern sought after during the search for a match. Further, such a process does not use information available to improve search efficiency. Further, the amount of time required to process images, even with fast computers, is so slow that human interaction with the process, either by picking reference views to be compared against the image or by modifying the search on an interactive basis is so long as to be impractical.

Such correlation methods are also relatively inflexible. For example, if someone desired to change the reference image or the search algorithm, or the decision criterion for determining correlation, software would need to be modified and re-coded and the source code would need to be re-compiled before such a change could be implemented. As a result, a user is unable to quickly evaluate results to determine the correctness of a correlation produced by automated means and to modify it interactively to get better results.

In view of the above, it would be desirable to provide a system which can produce three dimensional images without the drawbacks of the prior art.

DISCLOSURE OF THE INVENTION

One advantage of the present invention is to permit the creation of a stereoscopic image from two images of the same scene produced by the same camera from different view points, where the distance separating the cameras is not fixed.

A further advantage of the invention is that stereoscopic images can be viewed without complicated lens arrangements of the prior art.

Another advantage of the invention is that depth from two images of the same scene which have been correlated can be calculated so that one knows which points on one image correspond to the same points on the related image.

Another advantage of the invention is interactive image correlation.

Another advantage of the invention is interactive correlation can be used to specify related points on two images and to utilize that information to improve search efficiency and to reject incorrect correlations.

Another advantage of the invention is that very fast correlation of images enables alteration of parameters after each iteration. In this way, particular correlation techniques can be optimally applied to subsets of the entire images being correlated. Another advantage provided by the invention is flexibility in image correlation by allowing a variety of program modules to be selected and implemented at hardware speeds during interactions with the user.

Anotheradvantageof the invention is very rapid image processing achieved by utilizing field programmable gate arrays which can be partially reprogrammed on the fly during program execution to change the hardware configuration to implement selectable program modules.

According to the invention, these and other objects and advantages are attained by providing a reconf igurable hardware accelerator board for image processing which has a board bus which terminates in a connector for connecting to the bus of a computer. A digital signal processor chip is optionally connected to the bus together with one or more field programmable gate arrays capable of being partially reprogrammed during execution of a program.

In an image correlation application, the field programmable gate arrays are configured to provide a plurality of functions including (1) defining the size and shape of a correlation patch and the locations of patches, (2) performing an image correlation computation, (3) selecting the best correlation, and (4) generating a stereo contour or profile.

The reconfigurable hardware accelerator board includes a memory with an SRAM portion and a DRAM portion accessible by the field programmable gate arrays. The memory is used for storing modules for reconfiguring said field programmable gate arrays. The SRAM portion is used for image data input and output. A plurality of groups of program modules is stored in said memory, each for selectively configuring said field programmable gate arrays and/ or for controlling said digital signal processor.

In an image correlation application, program modules are selected for implementation by selecting at least one program module from each of the following:

1. A group of selectable modules, each of which defines a correlation patch of a particular size or shape, a resolution for the correlation, and/or a particular search sequence.
2. A group of selectable modules, each of which defines a method of comparing image patches to determine the degree of correlation by implementing one of (a) the sum of absolute differences, (b) the sum of the squares, (c) least squares, (d) logical AND, (e) logical OR, (f) logical XOR, or (g) logical image A AND NOT image B.
3. A group selectable modules, each of which defines a method for evaluating the quality of the correlation by basing a decision on one of (a) the minimum value of the sum of absolute differences, (b) average value of the sum of absolute differences, (c) ratio of the average correlation to the best correlation, (d) the shape of a plot of data history which measures the slope, (e) the minimum value divided by the maximum value, and (f) the shape of a plot of data history which measures the half value width of a trough experienced when a data minimum is passed over.
4. A group for generating a stereo contour or profile comprising a plurality of selectable modules, each of which defines a method for depicting depth in a two dimensional representation of a three dimensional image.

The reconfigurable hardware accelerator board is configured by selecting program modules from the program modules available and then implementing the modules in field programmable gate arrays. The reconfigurable hardware accelerator board reconfigures the programmable gate array (s) during the execution of a program to implement in hardware selected program modules stored in memory or to respond to an interactive selection by a user of at least one different module from at least one group of modules.

The invention is also directed to a method of improving the speed with which image processing can be performed by specifying the desired image processing function as a logical representation, implementing that logical representation as a set of hardware defining commands for a programmable gate array which can be reprogrammed during program execution, and configuring the programmable gate array with the set of hardware defining commands.

The invention provides to a user directed, computer assisted method of interactively correlating two different images of a scene by, for each of a plurality of patches of a first image, identifying one patch of that first image as a reference patch, and repeatedly selecting candidate patches of a second image and comparing the reference patch with the candidate patches. The identities of the reference patch and the candidate patch which best matches the reference patch are stored until each of the reference patches has a best match candidate patch. The set of best matches constitutes a correlation of the first and second images. A three dimensional representation is produced from the set of best matches. If the displayed representation is considered inadequate by the user, the user modifies either the patch, the process by which the comparison between the reference patch and candidate patches is made, or the criterion used to judge best match, and the previous steps are repeated until a satisfactory correlation is achieved.

Image correlation can be accelerated by identifying, by user input, pairs of corresponding points on the first and second images and using information provided by those pairs to eliminate matches which are inconsistent with the user input. As a result, correlations which are progressively more consistent with user supplied information may be obtained by iteration.

Image correlation can be accelerated by a user identifying a region of either the first or second image for correlation, and by correlating only the portion of the image within said region. In this way, only regions in which displayed correlation is unsatisfactory may be subject of iterative correlation.

The invention also provides a method of measuring distance h of a point D from a line joining the points (C and F) from which two images of the same scene were captured, knowing the focal length f of the objective used to capture the images. The center point of each image is defined as an origin of a set of image reference axes pointing in the x, y and z directions, respectively. The offsets in one of the x and y directions of a point on the first image and of a corresponding point of a second image are measured and the angles formed between a line joining point D, the focal point of the objective and the image of point D and one of the x or y planes are calculated for each of the images. Then, the distance h is calculated using the measured offsets, the focal length and the angles.

The invention also provides a method of determining a depth profile of a scene referenced from a line joining the points (C and F) from which two images of the same scene were captured, knowing the focal length of the objective used to capture the images by: selecting the resolution at which the depth profile is to be generated; selecting an array of points of the scene forming the intersections of a grid of lines separated by the desired resolution; for each point in the array defining the center point of each image as an origin of a set of image reference axes pointing in the x, y and z directions, respectively, measuring offset in one of the x and y directions of a point on the first image and of a corresponding point of a second image, determining the angles formed between a line joining point Z, the focal point of the objective and the image of point Z in the x-y plane and one of the x-z or y-z planes for each of the images, and determining the depth distance using the measured offsets, the focal length and the angles; and storing in a database the depth values for each point in the array.

The invention also provides a method of creating a three dimensional representation of an object by capturing an image of the object from two different points C and F using an objective of known focal length; selecting the resolution at which the depth profile is to be generated; selecting an array of points of the scene forming the intersections of a grid of lines separated by the desired resolution; for each point in the array, defining the center point of each image as an origin of a set of image reference axes pointing in the x, y and z directions, respectively, measuring offset in one of the x and y directions of a point on the first image and of a corresponding point of a second image, determining the angles formed between a line joining point D, the focal point of the objective and the image of point D in the x-y plane and at least one of the x-z or y-z planes for each of the images, and determining the depth distance using the measured offsets, the focal length and the angles; defining a set of object space reference axes with the origin at the midpoint of the line joining points C and F and an x axis in the direction of the line joining points C and F, a y axis perpendicular to the x axis and running perpendicular to the earth's surface and a z axis parallel to the earth's surface in the direction of the depth distance; using the information thus determined to calculate the position in object space of each of the array of points in image space which fall on the object, and storing in a three dimensional database x, y and z coordinates in object space for each point in the array.

The representation of an object in a three dimensional database thus determined is used to produce an animation of the object or an anaglyph of the object.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable for other and different embodiments, and its several details are capable of modifications in various obvious respects, all without departing from the invention. Accordingly, the drawing and description are to be regarded to be illustrative in nature and not as restrictive.

BEST MODE FOR CARRYING OUT THE INVENTION

Figure 1:
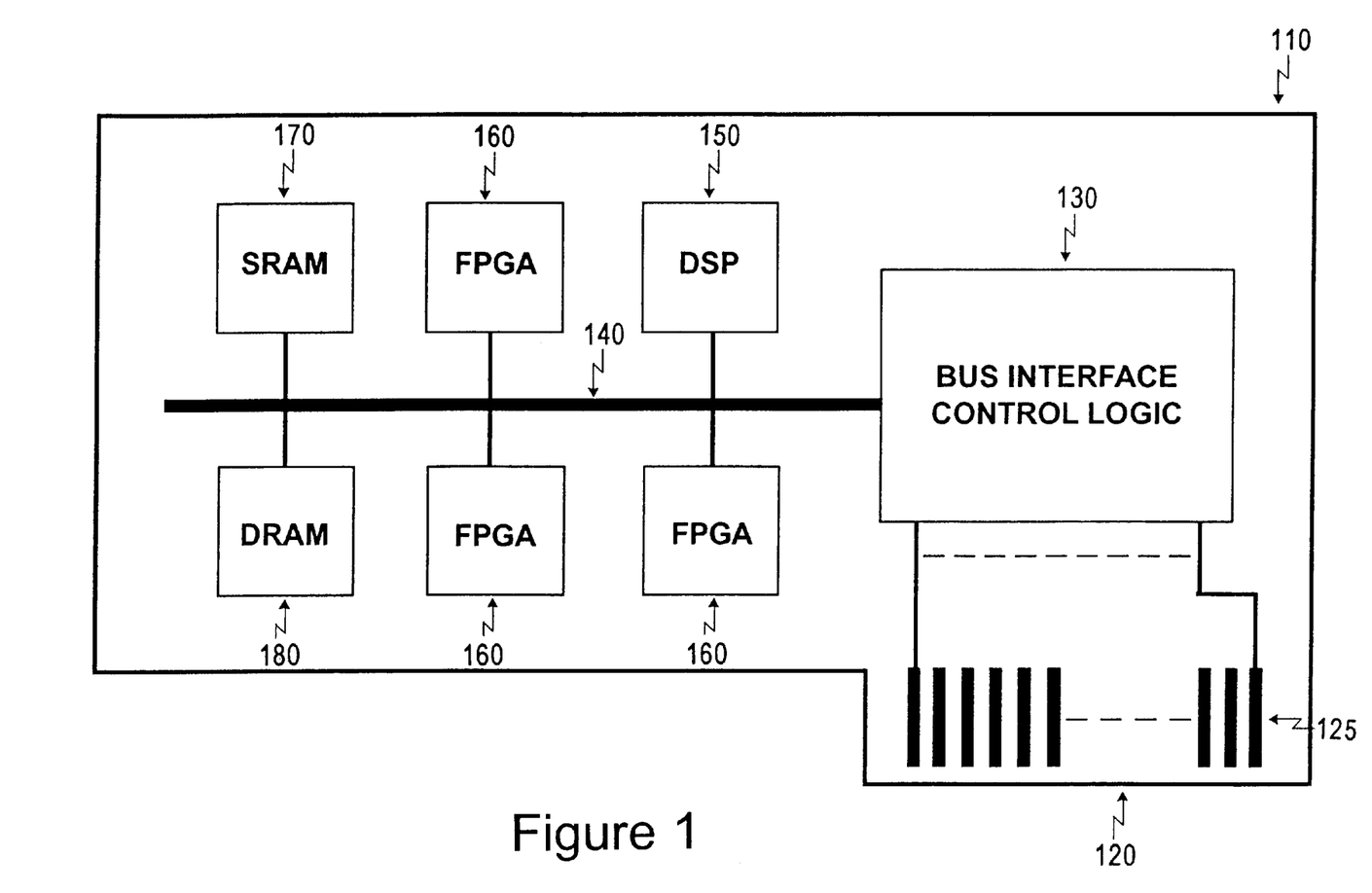
FIG. 1 is a diagram of the hardware architecture of an accelerator board according to the invention.
Figure 2A:
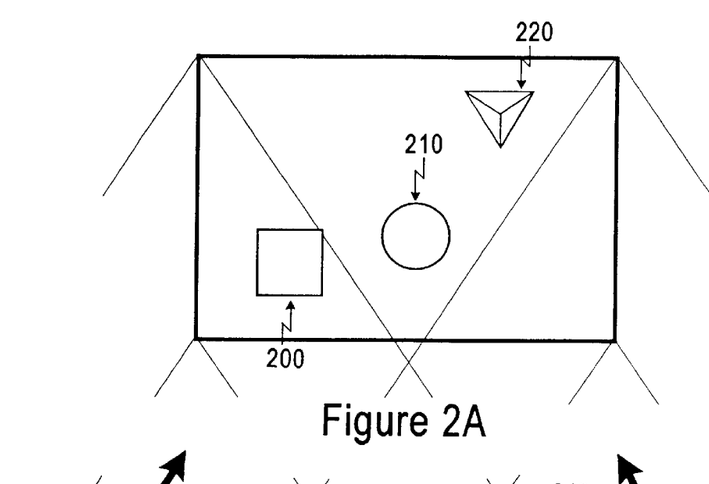
FIG. 2 is a sketch showing problems involved in correlating different images of the same scene.
Figure 2B:
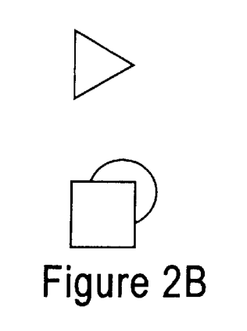
Figure 2C:
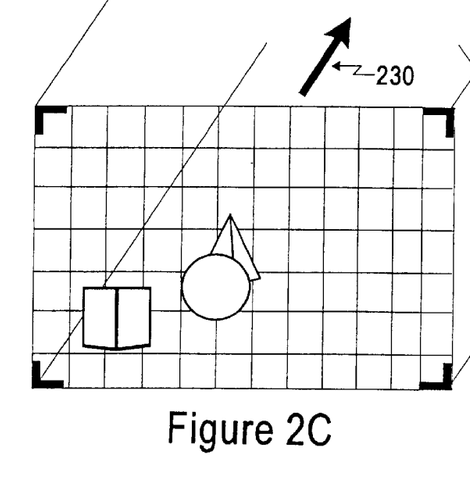
Figure 2D:
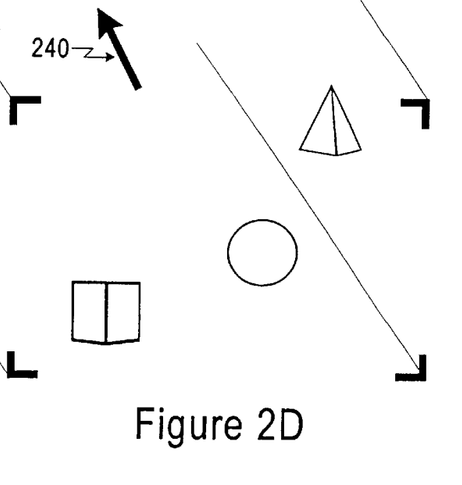

The hardware architecture of the accelerator board, according to the invention, is shown in FIG. 1. Printed circuit board 110 provides a mounting and interconnection substrate for the various components of the accelerator board. PC board 110 is designed in size and shape to mount on a motherboard of a computer. Connector area 120 is designed to fit into a connector mounted on the motherboard and provide connection to the computer bus on the motherboard. A number of conductive paths are exposed to make such contact. Bus interface logic 130 provides logic necessary to interface the host computer bus on the mother board with accelerator board local bus 140 which services the major components of the accelerator board. A digital signal processor 150, three field programmable gate arrays 160, static RAM memory 170 (SRAM) and dynamic RAM 180 (DRAM) are connected to local bus 140.

The digital signal processor (DSP) 150 provides high-speed digital processing. The digital signal processor 150 may work alone or in conjunction with field programmable gate arrays 160 to implement very fast image processing functions. Static RAM 170 is very fast memory utilized, among other things, for the storage of image input and output information. Dynamic RAM 180 is used to store data which is subject to less stringent storage and retrieval requirements.

The inactive areas of field programmable gate arrays (FPGAS) 160 can be fully or partially reprogrammed down to the cell level on-the-fly, in real time, without disrupting the register states, logic configuration, clocking or I/O states of active cells. FPGAs 160 can reprogram so quickly that only the active portions of the logic need be resident on the chip at any time. When an active region becomes inactive, it can be swapped out and the area(s) it previously occupied reconfigured to perform functions of other modules or functions which are becoming active. Thus, the field programmable gate array 160 can be utilized to implement quickly changing hardware designs. Such FPGAs may be, for example, series AT6000 field programmable gate arrays commercially available from the ATMEL Corporation of San Jose, Calif. The FPGAs can be used separately alone or together with the DSP.

The accelerator board of FIG. 1 has utility in a wide variety of applications and is particularly suited for image processing applications. The application of the board will be illustrated with respect to the problem of image correlation experienced when trying to reconcile two different views of the same scene.

FIG. 2 illustrates the problem posed by general image correlation. FIG. 2 shows a top view, a side view and left and right image views of three objects, namely a cube 200, a sphere 210 and a pyramid 220 spatially arranged as shown in the top and side views of FIG. 2. When viewed in the direction indicated by the arrow 230, the three objects 200, 210 and 220 appear as shown in the left image view. When viewed in the direction of the arrow 240, the objects appear quite different in the viewing plane. Most notable, perhaps is that, in the left image view, sphere 210 obscures a good portion of pyramid 220 whereas in the right image view, the objects appear separate.

Certain points in both images clearly correspond although their positioning on the image plane is different. The apex of the pyramid is visible in both images. Two visible vertical edges of the cube clearly correspond in both images, however, a different third edge is visible in each view.

Although this example is rather exaggerated, it reflects the problems of image correlation. Points in the real world three dimensional scene projected onto an image plane from one viewing direction are situated quite differently on a different image plane taken from a different direction. The relationship between the points on the first and second image planes which correspond to the real world objects do not map to each other in a linear, well-behaved manner. As a result, the identification of the points in a second image plane which correspond to points in a first image plane cannot be algorithmically determined in a simple fashion, if at all.

One way of undertaking the correlation of points in the second image plane which correspond to those on the first image plane is to select a group of pixels of a certain size and shape, not uncommonly rectangular, from the first image and then exhaustively compare that reference patch of pixels with every possible pixel combination in the second image which corresponds in size and shape. The object of such a comparison is to identify the single target or candidate patch from all the possible patches of the second image which best matches the reference patch. If, for every reference patch in the first image, the corresponding best match is identified in the second image, the images are correlated. Since no simple mapping exists between correlated points on the second and first images, one way of producing image correlation is by an exhaustive search in the manner just described.

There are certain problems with an automated exhaustive search. One of the problems arises when there are areas of the image in which each patch is virtually identical with large numbers of others. One example of this is a photograph of a field of snow. One little patch of snow is virtually identical with every other patch of snow. Thus, one patch of snow will correlate very well with not just one but with a large number of other patches of snow. The information that is obtained from comparison of very similar patches of snow is relatively useless. A similar problem exists with respect to images of non-stationary objects such as trees if images are not captured simultaneously, there will be some relative motion which will add to the difficulties in correlating corresponding points on the two images. Correlating information with objects such as trees and bushes is inherently difficult because the patterns of white and dark repeat in ways which can result in high degrees of correlation with points which are truly unrelated in the original scene.

Figure 3:
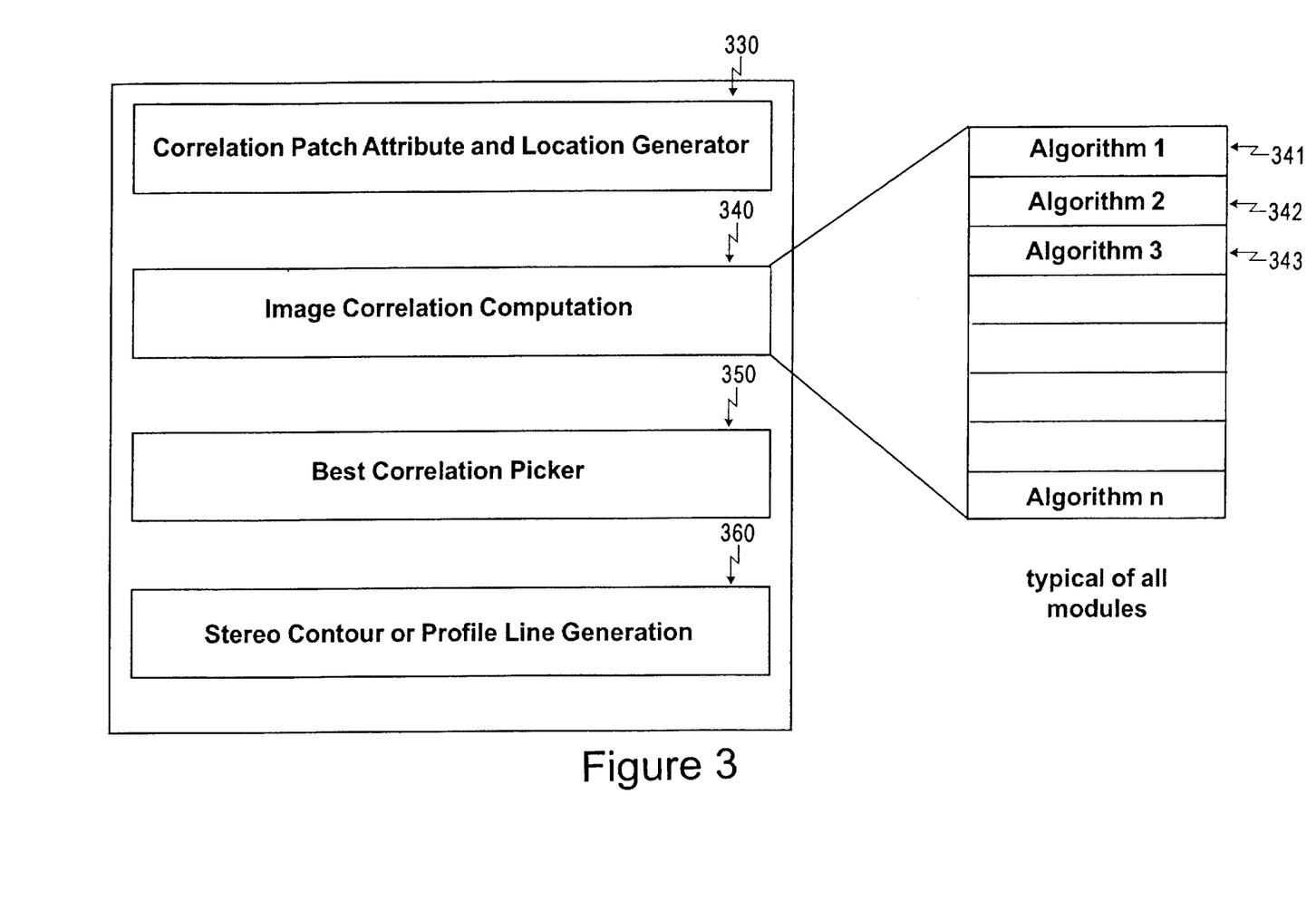
FIG. 3 is a diagram of the software architecture of the accelerator board when configured for use in image correlation.

Many of the problems inherent in correlation can be overcome utilizing the hardware architecture of the accelerator board shown in FIG. 1 in combination with the software architecture shown in FIG. 3. Four major groups of functionality are shown for the correlation software. The correlation patch attribute and location generator 330 establishes the size and shape of the reference and candidate patches and controls address generation so that appropriate patches of the reference and target image may be compared during the correlation search process. Image correlation computation 340 performs the actual comparisons between the reference and target patches selected by the correlation patch attribute and location generator 330. The best correlation picker 350 takes the correlation results from image correlation computation 340 and selects the patch of the target image which best correlates with the reference patch. Stereo contour or profile line generation 360 displays the 3D representation of the correlation data as it currently exists in the memory of the system. This allows a user to detect anomalies visually and redirect the correlation process so that it more nearly converges to the actual three dimensional profile.

This particular software architecture offers substantial advantages when implemented on the hardware accelerator board described above. The combination of hardware and software permits a tool kit approach to image processing. Using the FIG. 3 example, if there were ten combinations of patch shape and size and search patterns that were frequently used, these could be implemented as ten options for correlation patch attribute and location generator 330. Similarly, if there were ten types of correlation computation that were frequently utilized, these could be implemented as ten options for image computation 340 as illustrated by algorithms 1–N of FIG. 3. Similarly, if there were ten ways to select which results represented the best correlation, these could be implemented as ten options for best correlation picker 350. Similarly, if there were ten options for stereo contour or profile line generation, these could be implemented in block 360.

Before Applicants' invention, a software designer would select the desired option for each of the blocks indicated in FIG. 3 and would hard code a program implementing the desired set of functionality. At worst case, this would require 10,000 programs to implement every combination of functionality. In practice, certain options may be implemented with software switches but this too is relatively inflexible because once the overall program is compiled, additional functions cannot be added without recompiling the entire program.

By implementing the software architecture of FIG. 3 using the field programmable gate arrays of the hardware accelerator board described above, only 40 program modules need to be developed, ten for each block. Thus 40 program modules can be swapped in and out on a user selected basis to implement all possible combinations of functionality. Instead of a worst case of 10,000 programs being required, a worse case of 40 programs is required to achieve the same capability. Further, great flexibility is gained in the ability to add new functions without having to rewrite the software. Program development for the field programmable gate arrays is done by translating the desired functionality into a digital logic schematic representation. A broad range of industry standard platforms and CAE/CAD tools are available which capture digital logic and translate it into a hardware design using the cell library for the particular programmable gate arrays in use. Typical design tools include Cadence/Composer™, Cadence/Concepts™, View Logic™, Mentor™ and Synopsis™. Once a particular module is created and validated utilizing such design tools, the configuration information can be loaded into memory on the accelerator board and swapped in and out of the field programmable gate array(s) on the fly during program execution as desired.

Figure 4:
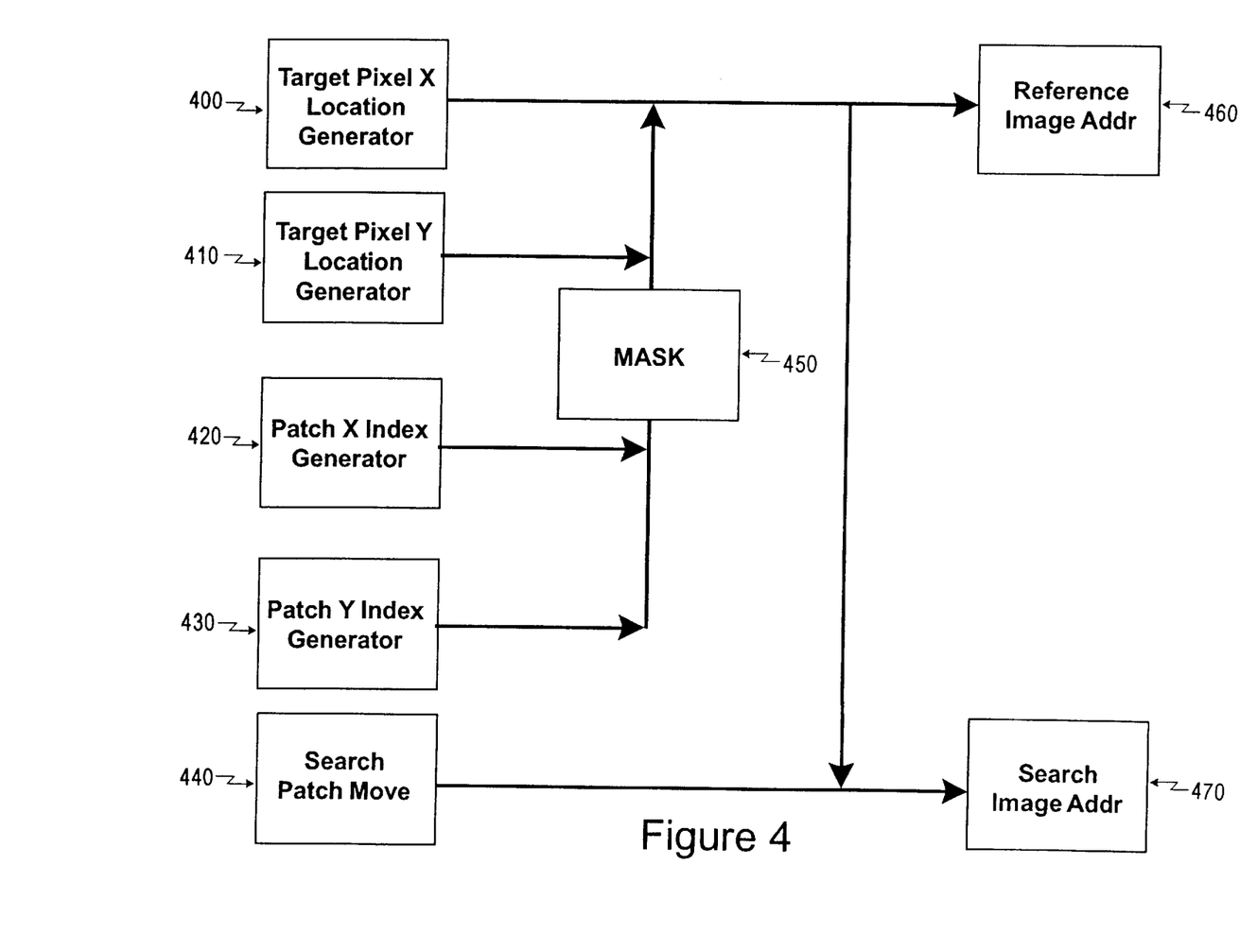
FIG. 4 is a block diagram of an implementation of the patch attribute and location address generator.

FIG. 4 shows one implementation of a correlation patch attribute and location address generator. Target pixel X location generator 400 and target pixel Y location generator 410 define the X and Y coordinates on the image from which pixel information corresponding to the reference and candidate patches should be taken. The reference image address 460 is the address of the reference patch and the search image address 470 is the address of the target or candidate patch which is to be compared against the reference patch. Patch X index generator 420 and patch Y index generator 430 give the width and height of a rectangular array of pixels corresponding to a patch. Non-rectangular patches may be generated for custom purposes utilizing a programmable mask 450. Thus, the patch X and Y generators 420 and 430 together with mask 450 define the size and shape of the patch. Target pixel X and Y location generators 400 and 410 define the location or placement of the patches on the respective reference and search images. Search patch move block 440 defines the path of the search, that is, given that a particular patch is being compared, how is the next patch selected for comparison.

Figure 5:
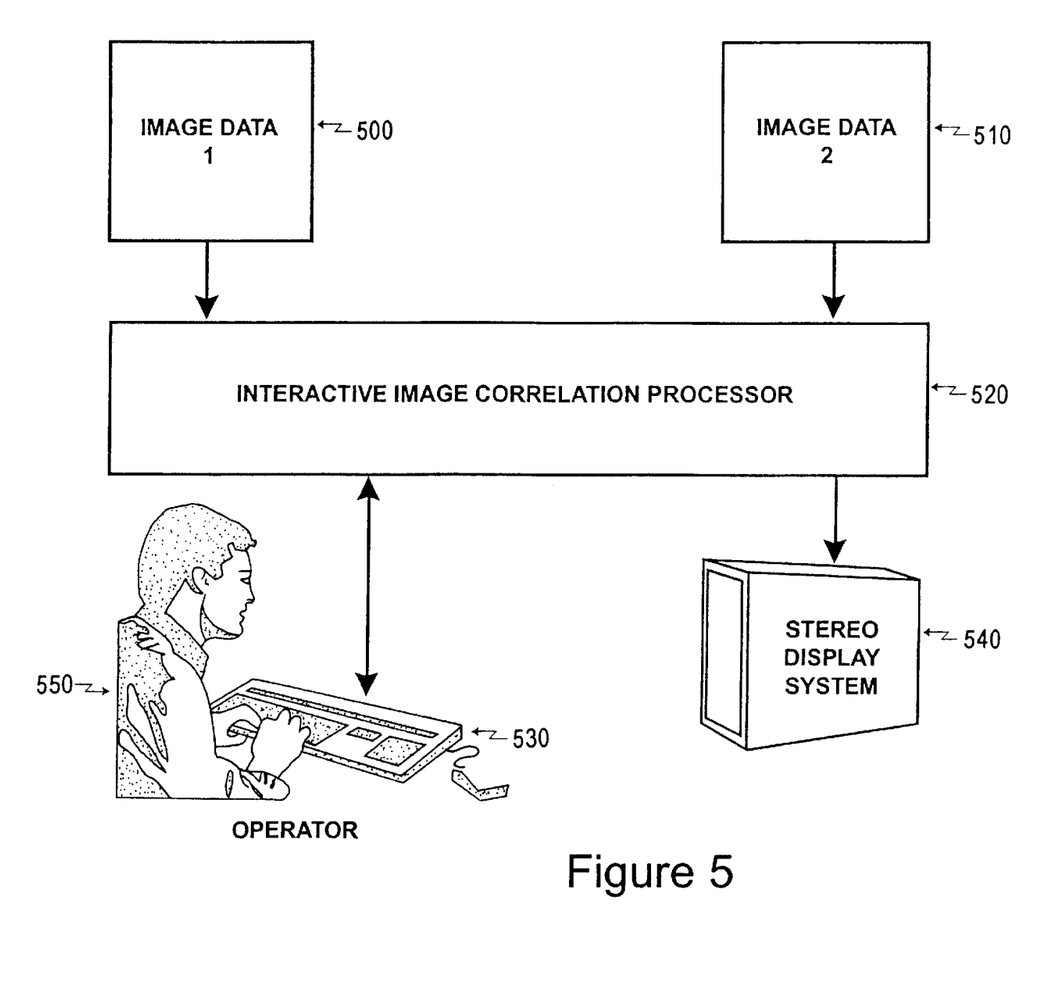
FIG. 5 is an illustration of user interaction with data and the hardware accelerator board to achieve correlation of two images.

FIG. 5 depicts, functionally, the interactive image correlation process. Image data 1 (500) and image data 2 (510) are fed to the interactive image correlation processor 520. A human operator 550 selects the parameters for the initial attempt to correlate image data 2 with image data 1. Once the parameters are set, the appropriate modules are loaded into field programmable gate arrays of the hardware accelerator board to configure the hardware of the FPGAs in accordance with the parameters selected by the human operator. The results of the initial correlation process are displayed on stereo display system 540 in such a way that the operator can see and make judgments about the adequacy of the correlation produced by the first iteration.

The operator may consider that the correlation is inadequate in certain respects. At this point, the operator may assist the correlation process by a number of techniques. For example, the operator may identify points on image 1 and image 2 which are easily recognizable as correlated. This provides additional information which can be utilized during the next iteration to refine the correlation. In addition, the operator may identify certain regions of, for example, image data 1 where better results are needed. The operator can limit additional correlation processing to those areas to improve system response times. With experience, the operator will learn which types of modules should be selected for each of the major functional areas of the correlation processor to ensure best results. The operator may desire to change the shape of the patch or the size of the patch in order to get better results. When appropriate adjustments to parameters have been made by the operator another iteration of the of the correlation process occurs and revised results are displayed. Thus, the operator can interact with the system to converge progressively toward an acceptable correlation of the images.

One should appreciate that this type of interaction was not possible in the prior art because of the difficulties of software development and because of the slow response times of the prior art.

Figure 6:
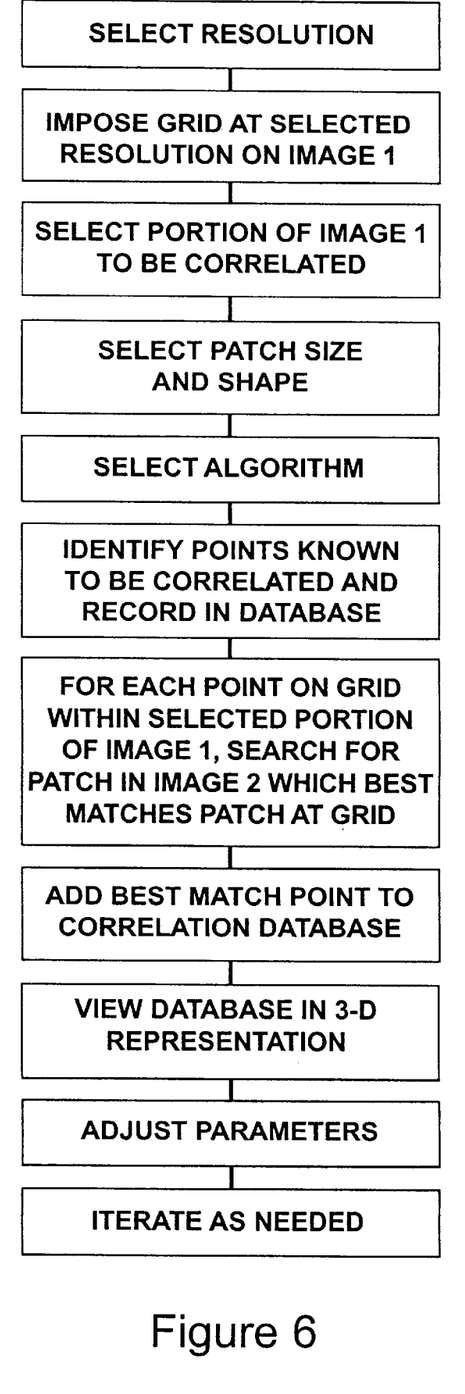
FIG. 6 is a flow chart of interactive image correlation.

FIG. 6 shows a flow chart of one image correlation process suitable for implementation on the hardware accelerator board described above. FIG. 6 assumes that two images, image 1 and image 2 have been read into memory in the accelerator board for processing.

Initially, the operator selects the resolution (600) at which the correlation is desired. Once the resolution is selected, the system imposes a grid (610) over image 1 at the selected resolution. Then the operator selects (620) a portion of image 1 to be correlated. Initially, this would be the entire image. The operator then selects (630) the patch shape and size and the algorithm (640) to be used for correlation. Optionally, the operator may then identify points on image 1 which correspond to points on image 2 and these are entered into the database. Then, for each point on the grid imposed on image 1 within a selected portion, a patch is selected and a search is undertaken for the best match from image 2. See block 660. Once the best match is identified, the point on image 2 corresponding to the point on image 1 is added to the correlation database (670). The database thus created will contain a listing of points on image 1 at the intersections of the grid and the corresponding points on image 2 which are considered to correlate with the information on image 1. The results of the correlation are then displayed stereographically to the operator who makes a judgment as to the adequacy of the three dimensional representation. If the results are not yet satisfactory, the operator can adjust the parameters of the correlation process in order to improve the results and conduct additional interactions until the correlated end product is considered satisfactory.

A number of search patterns can be implemented by the correlation patch attribute and a location generator 330. These can include, inter alia, a rastor scan type search, a manhattan search with different numbers of steps, spiral search, a diagonal search, a cross diagonal search or any number of searches which may lend themselves to particular types of image information.

A correlation computation can be accomplished by comparing patches using the sum of absolute differences, the sum of the squares, least squares, logical and, logical or, logical X or, or logical image A AND NOT image B.

The best correlation picker may implement, inter alia, one or more of the following examples: minimum value of the sum of absolute differences, the average value of the sum of absolute differences, the ratio of the average correlation to the best correlation, the shape of a plot of data history which measures slope, the minimum value divided by the maximum value, and the shape of a plot of data history which measures a half value width of a trough experienced when a data minimum is passed over.

Figure 7:
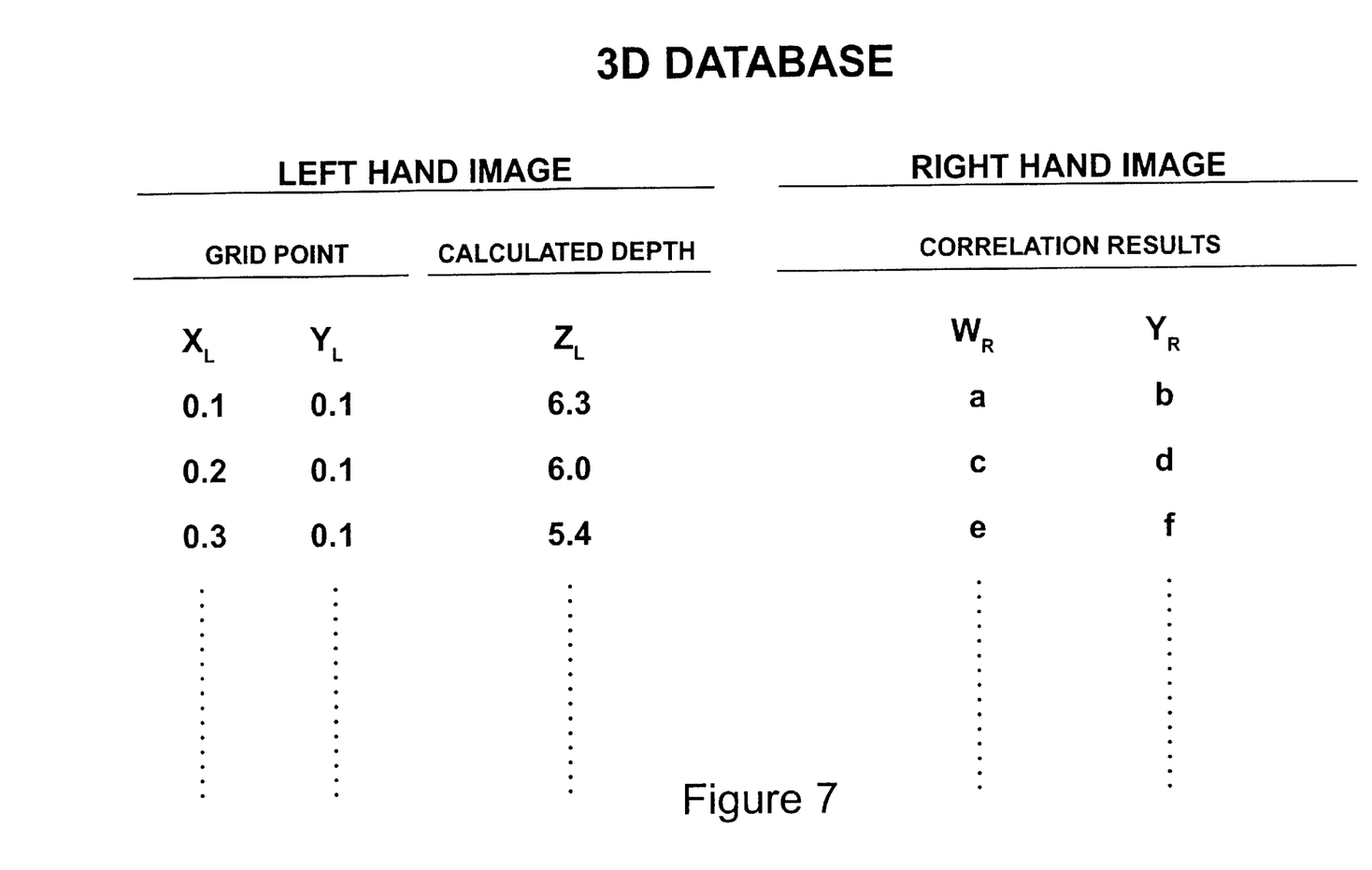
FIG. 7 is a layout of a three dimensional data base.

FIG. 7 illustrates the layout of a three dimensional database for use in capturing correlation information. Once the resolution at which the correlation is to be conducted has been selected, a grid is overlaid on image 1 with lines corresponding to that resolution. The intersection of the lines of the grid define points on the reference image where reference patches will be identified and for which a correlation search of patches in the target image will be made. Thus, the 3D database can be viewed as a table with left hand image information and right hand image information. The X and Y coordinates of the left hand image constituting essentially grid points and the entry under right hand image corresponding to that grid point will be the point in the right hand image which best correlates with the patch at the grid point. The information $Z_L$ from the database will be discussed hereinafter.

Figure 8:
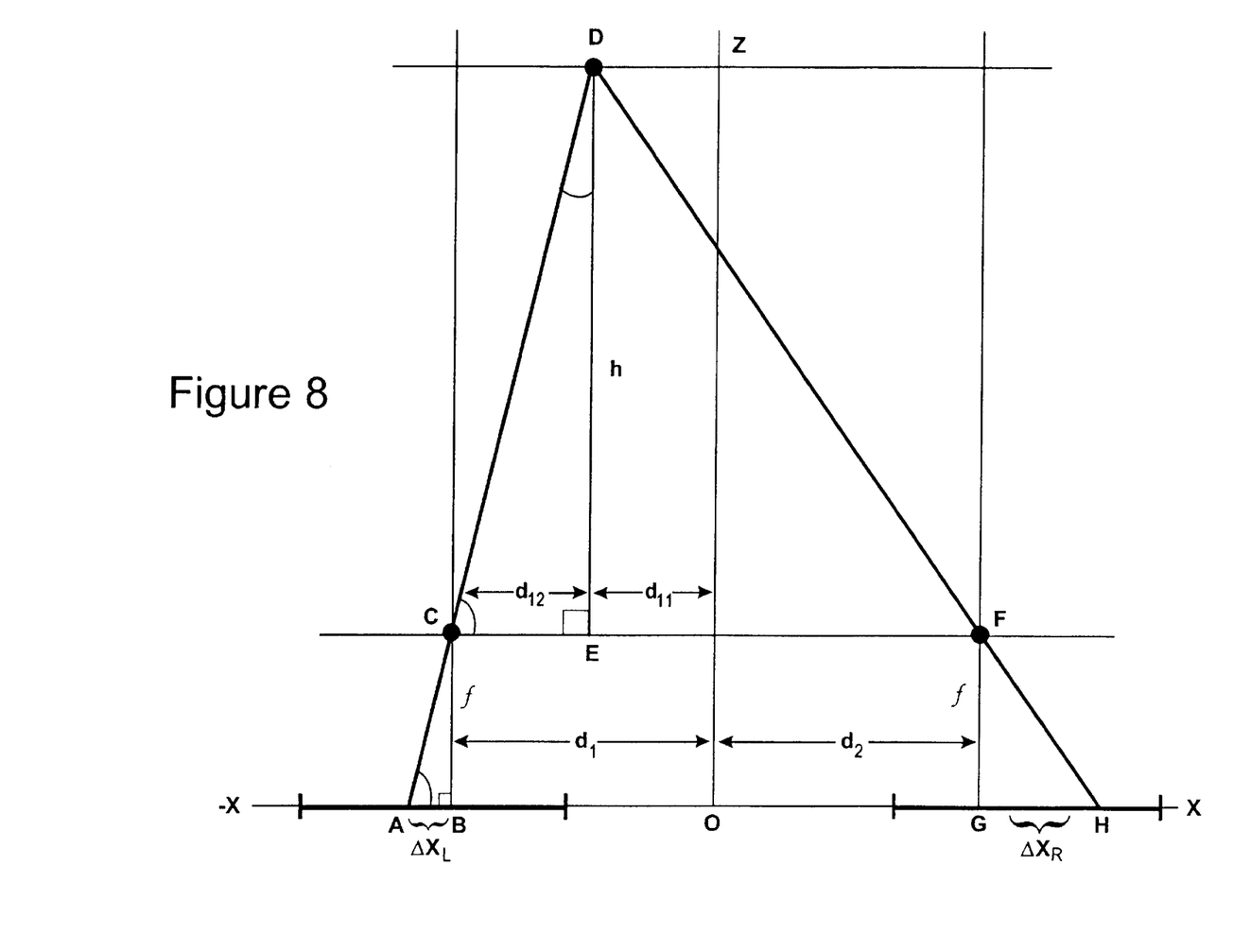
FIG. 8 is a representation of optical relationships from which a determination of depth (Z coordinate) can be obtained from two images of the same scene.
Figure 9:
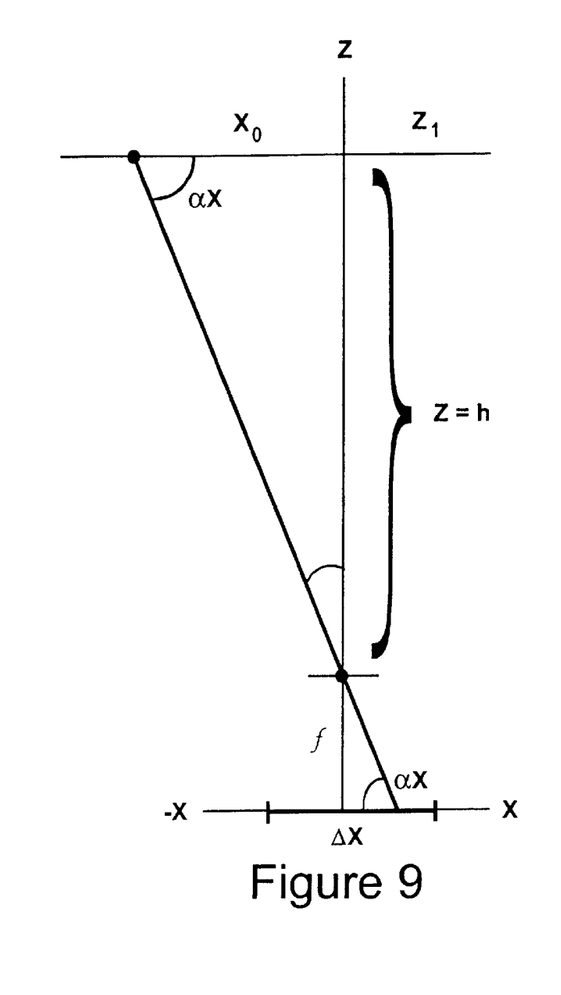
FIG. 9 is a representation of relationships utilizable to obtain the X offset from the Z coordinate and image information.

FIG. 8 illustrates a calculation of depth from two different images of the same scene. Assume a set of axes with origin at 0, the X and Z axes as shown in FIG. 9 and the Y axis being perpendicular to the plane of the page. Assume that the images are captured with an objective at point C and an objective at point F in FIG. 8. The distance between C and F being $d_1+d_2$. The camera capturing the image will have a known focal length F and the image plane corresponding to each of the points at which the image is captured is shown in a heavy line on the X axis. The distance of the point labeled D from the line joining the focal points of the camera (C & F) can be calculated as follows:

Triangles ABC and CED are similar in a geometric sense and triangles DEF and FHG are also similar.

Because they are similar, $$\frac{h}{f} = \frac{d_{12}}{\Delta X_L} \qquad (1)$$

-continued $$\frac{h}{f} = \frac{d_2 + d_{11}}{\Delta X_R} \quad (2)$$

$$d_1 = d_{11} + d_{12} \quad (3)$$

$$h = \frac{d_{12}}{\Delta X_L} = \frac{d_2 + d_{11}}{\Delta X_R} \quad (4)$$

Equating (1) and (2) and the subtracting the right hand term from both sides of the equation results in:

$$\frac{d_{12}\Delta X_R - (d_2 + d_{11})\Delta X_L}{\Delta X_L \Delta X_R} = 0 \quad (5)$$

For the prior equation to be true, the numerator must=0.

$$d_{12}\Delta X_R - (d_2 + d_{11})\Delta X_L = 0 \quad (6)$$

Solving equation 3 for $d_{11}$, substituting in equation (6) and moving the right term to the right side of the equation results in:

$$d_{12}\Delta X_R = (d_2 + d_1 - d_{12})\Delta XL \quad (7)$$

$$d_{12}(\Delta X_R + \Delta X_L) = (d_2 + d_1)\Delta X_L \quad (8)$$

$$d_{12} = \frac{(d_2 + d_1)\Delta X_L}{(\Delta X_R + \Delta X_L)} \quad (9)$$

$$d_{11} = d_1 - \frac{(d_2 - d_1)\Delta X_L}{(\Delta X_R + \Delta X_L)} \quad (10)$$

$$h = f\frac{(d_2 + d_{11})}{\Delta X_R} = f\frac{d_{12}}{\Delta X_L} \quad (11)$$

Figure 10:
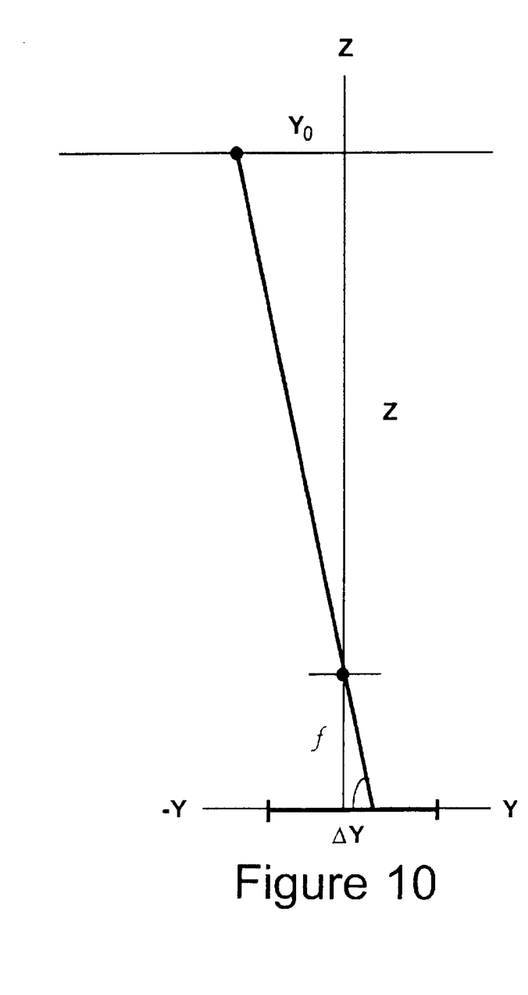
FIG. 10 is a representation of relationships utilizable to obtain the Y offset from the Z coordinate and image information.

Once h is known, the coordinates $X_0$ and $Y_0$ of the point O can be defined with respect to a camera axis by the following. See FIGS. 9 and 10.

$$\alpha_x = \tan^{-1} F/\Delta X \quad (12)$$

$$\alpha_y = \tan^{-1} F/\Delta Y \quad (13)$$

$$X_0 = -h \cot \alpha_x \quad (14)$$

$$Y_0 = -h \cot \alpha_y \quad (15)$$

Thus the data from two correlated images captured from known positions can be used to derive a three dimensional database which represents the scene depicted in the two images.

The system disclosed enables interactive image processing because a unique combination of features enables extremely fast response times. These features include the selection of resolution; the implementation of program modules in hardware; the ability to reprogram correlation parameters on the fly without recompilation of the entire program; and the interaction of the operator to change parameters and to provide information to guide the correlation process and to focus on areas constituting only parts of the image for correlation all work together to provide image correlation which converges much quicker than prior art systems at much lower development and operational cost.

Being able to determine depth from two different images of the same scene allows the creation of a three dimensional representation of an object which can be utilized to create anaglyphs, create animations or to measure the physical extent of the scene captured.

In this disclosure, there is shown and described only the preferred embodiment of the invention, but, as forementioned, it is to be understood that the invention is capable of use in various other combinations and environments and is capable of changes or modifications within the scope of the inventive concept as expressed herein.

What is claimed is:

1. A reconfigurable hardware accelerator board comprising:

a. an onboard bus terminated in a connector for connecting to a bus of a computer, b. one or more field programmable gate arrays capable of being partially reprogrammed during execution of a program, connected to the bus, c. a memory accessible by said one or more field programmable gate arrays, d. a processor for loading a plurality of program modules in said memory, each for configuring said one or more field programmable gate arrays, and for reconfiguring the programmable gate arrays during the execution of a program to implement in hardware selected program modules stored in memory in which the field programmable gate arrays are configured to provide:

e. at least one module for defining a series of correlation references patches each around a reference point and for specifying the locations of candidate patches for correlation with each reference patch, f. at least one module for performing an image correlation computation by comparing each reference patch with candidate patches, and g. at least one module for selecting the candidate patch which best correlates with a reference patch.

2. The hardware accelerator board of claim 1 in which the at least one module for defining a series of correlation reference patches and for specifying the locations of candidate patches, comprises a plurality of selectable modules, each of which defines a correlation patch of a particular size or shape, a resolution at which correlation will be conducted, and/or a particular search sequence.

3. The hardware accelerator board of claim 1 in which the means for performing an image correlation computation, comprises a plurality of selectable modules, each of which implements a different method of comparing image patches to determine the degree of correlation.

4. The hardware accelerator board of claim 3 in which at least one of the selectable modules implements one of the following algorithms:

a. sum of absolute differences, b. sum of squares, c. least squares d. logical AND, e. logical OR, f. logical XOR, or g. logical image A AND NOT image B.

5. The hardware accelerator board of claim 1 in which the at least one module for selecting the candidate patch which best correlates comprises a plurality of selectable modules, each of which defines a different method for evaluating the quality of the correlation.

6. The hardware accelerator board of claim 5 in which at least one of the selectable modules implements one of the following:

a. minimum value of the sum of absolute differences, b. average value of the sum of absolute differences, c. ratio of the average correlation to the best correlation.
d. the shape of a plot of data history which measures the slope,
e. the minimum value divided by the maximum value, and
f. the shape of a plot of data history which measures the half value width of a trough experienced when a data minimum is passed over.

7. A reconfigurable hardware accelerator board used for image processing comprising:
   a. an onboard bus terminated in a connector for connecting to a bus of a computer,
   b. a digital signal processor chip connected to the bus,
   c. one or more field programmable gate arrays capable of being partially reprogrammed during execution of a program, connected to the bus, the field programmable gate arrays being configured to provide:
      c1. at least one module for defining a series of correlation reference patches and for specifying the locations of candidate patches for correlation with each reference patch;
      c2. at least one module for performing an image correlation computation by comparing each reference patch with one or more candidate patches; and
      c3. at least one module for selecting the best correlation of a reference patch with a candidate patch;
   d. a memory comprising an SRAM portion and a DRAM portion accessible by said one or more field programmable gate arrays, said memory being used for storing modules for reconfiguring said field programmable gate arrays said SRAM portion being used for image data input and output,
   e. means for storing a plurality of groups of program modules in said memory, each for selectively configuring said field programmable gate arrays and/or for controlling said digital signal processor, the program modules being selected for implementation by selecting at least one program module from each of the following groups of program modules:
      e1. a group comprising a plurality of selectable modules, each of which defines a correlation patch of a particular size or shape, a resolution for the conduct of the correlation, and/or a particular search sequence,
      e2. a group for performing an image correlation computation, comprising a plurality of selectable modules, [each] at least one of which defines a method of comparing image patches to determine the degree of correlation by implementing one of a. sum of absolute differences, b. sum of the squares, c. least squares d. logical AND, e. logical OR, f. logical XOR, or g. logical image A AND NOT image B;
      e3. a group for selecting the best correlation comprising plurality of selectable modules, at least one of which defines a method for evaluating the quality of the correlation by implementing either 1. minimum value of the sum of absolute differences, 2. average value of the sum of absolute differences, 3. ratio of the average correlation to the best correlation. 4. the shape of a plot of data history which measures the slope, 5. the minimum value divided by the maximum value, and 6. the shape of a plot of data history which measures the half value width of a trough experienced when a data minimum is passed over; and
   f. means for reconfiguring the programmable gate arrays during the execution of a program to implement in hardware selected program modules stored in memory.

* * * * *